US012444888B2

(12) United States Patent
Seibuchner

(10) Patent No.: US 12,444,888 B2
(45) Date of Patent: Oct. 14, 2025

(54) COIL SPRING AND CONNECTOR WITH A COIL SPRING

(71) Applicant: ODU GmbH & Co. KG, Muehldorf a. Inn (DE)

(72) Inventor: Stefan Seibuchner, Muehldorf a. Inn (DE)

(73) Assignee: ODU GmbH & Co. KG, Muehldorf a. Inn (DE)

( * ) Notice: Subject to any disclaimer, the term of this patent is extended or adjusted under 35 U.S.C. 154(b) by 393 days.

(21) Appl. No.: 17/844,841

(22) Filed: Jun. 21, 2022

(65) Prior Publication Data

US 2023/0006400 A1 Jan. 5, 2023

(30) Foreign Application Priority Data

Jun. 30, 2021 (EP) .................................... 21182800

(51) Int. Cl.

| | |
|---|---|
| ***H01R 13/6582*** | (2011.01) |
| ***H01R 13/24*** | (2006.01) |
| ***H01R 13/627*** | (2006.01) |
| ***H01R 13/629*** | (2006.01) |

(Continued)

(52) U.S. Cl.

CPC ......... *H01R 13/6582* (2013.01); *H01R 13/24* (2013.01); *H01R 13/6271* (2013.01); *H01R 13/6277* (2013.01); *H01R 13/629* (2013.01); *H01R 13/6583* (2013.01); *F16F 1/04* (2013.01); *F16F 1/06* (2013.01); *F16F 1/065* (2013.01);

(Continued)

(58) Field of Classification Search

CPC ........................... H01R 13/6582; H01R 13/24; H01R 13/6271; H01R 13/6277; H01R 13/629; H01R 13/6583; H01R 11/01; H01R 13/33; H01R 13/627; H01R 13/642; H01R 13/6581; H01R 24/60; H01R 2107/00;

(Continued)

(56) References Cited

U.S. PATENT DOCUMENTS

| | | | |
|---|---|---|---|
| 4,355,854 | A | 10/1982 | Williams |
| 5,059,143 | A | 10/1991 | Grabbe |

(Continued)

FOREIGN PATENT DOCUMENTS

| | | | |
|---|---|---|---|
| DE | 202018105926 | U1 | 12/2018 |
| EA | 201590538 | B1 | 6/2015 |

(Continued)

*Primary Examiner* — Justin M Kratt

(74) *Attorney, Agent, or Firm* — Laura W. Smalley; Harris Beach Murtha PLLC

(57) ABSTRACT

A coil spring has a longitudinal component located within the coil spring, where the longitudinal component runs generally along the direction of a longitudinal axis of the coil spring and where the longitudinal component is in contact with the coil spring, characterized in that the longitudinal component biases the coil spring into a shape different from its natural shape and/or from the shape into which the coil spring is biased by a groove in which the coil spring is accommodated. Moreover, the coil spring may be shaped by means of the described longitudinal component. Further, a connector part is disclosed that has the described coil spring and is configured for being connected with a mating connector part. And finally, a connector is disclosed which has the described connector part and the mating connector part.

13 Claims, 7 Drawing Sheets

(51) Int. Cl.

| | |
|---|---|
| ***H01R 13/6583*** | (2011.01) |
| *F16F 1/04* | (2006.01) |
| *F16F 1/06* | (2006.01) |
| *H01R 11/01* | (2006.01) |
| *H01R 13/33* | (2006.01) |
| *H01R 13/642* | (2006.01) |
| *H01R 13/6581* | (2011.01) |
| *H01R 24/60* | (2011.01) |
| *H01R 107/00* | (2006.01) |

(52) U.S. Cl.
CPC ....... *F16F 2230/0058* (2013.01); *H01R 11/01* (2013.01); *H01R 13/33* (2013.01); *H01R 13/627* (2013.01); *H01R 13/642* (2013.01); *H01R 13/6581* (2013.01); *H01R 24/60* (2013.01); *H01R 2107/00* (2013.01)

(58) Field of Classification Search
CPC ...... F16F 1/04; F16F 1/06; F16F 1/065; F16F 2230/0058
See application file for complete search history.

(56) References Cited

U.S. PATENT DOCUMENTS

| | | | | |
|---|---|---|---|---|
| 2005/0101168 | A1 | 5/2005 | Bernhart et al. | |
| 2014/0259617 | A1 | 9/2014 | Kompa et al. | |
| 2018/0135714 | A1 * | 5/2018 | Kompa ..................... | F16F 1/13 |
| 2022/0181798 | A1 * | 6/2022 | Watanabe ............ | H01R 4/4863 |

FOREIGN PATENT DOCUMENTS

| | | | | | |
|---|---|---|---|---|---|
| EP | 0463424 | B1 | | 12/1993 | |
| EP | 1 557 913 | A1 | | 7/2005 | |
| EP | 2267846 | A1 | | 12/2010 | |
| EP | 3 575 627 | A1 | | 12/2019 | |
| GB | 2127626 | A | * | 4/1984 | ....... H01R 13/65802 |
| JP | S48-9286 | B1 | | 3/1973 | |
| RU | SU00382315 | | | 11/1972 | |
| RU | 2116463 | C1 | | 7/1998 | |
| WO | 2015/123407 | A1 | | 8/2015 | |

* cited by examiner

Fig. 14
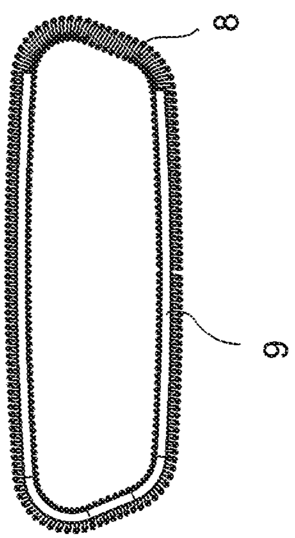
Fig. 16
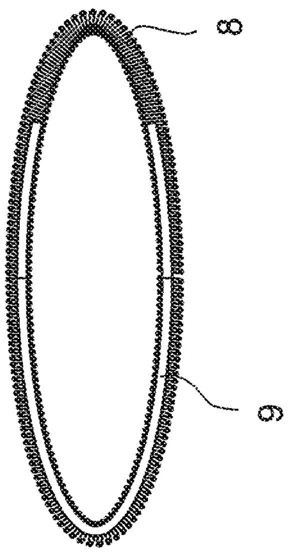
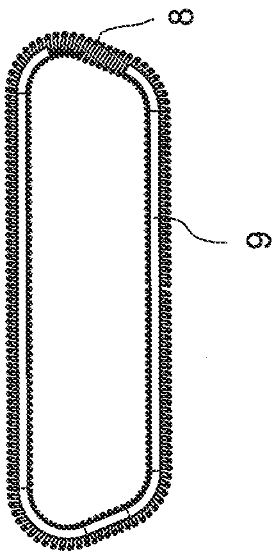
Fig. 13
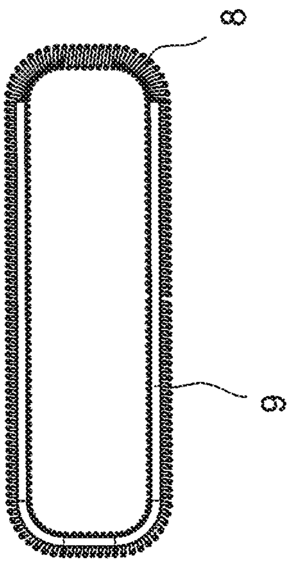
Fig. 15

Fig. 18
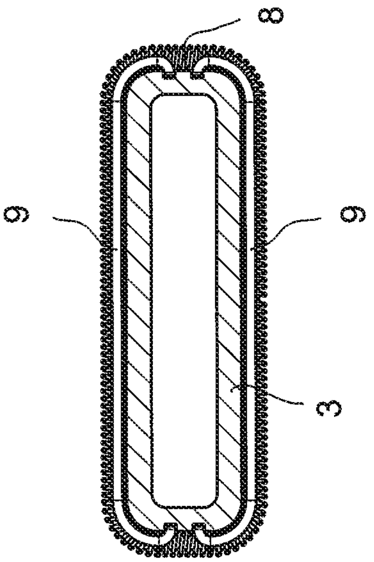
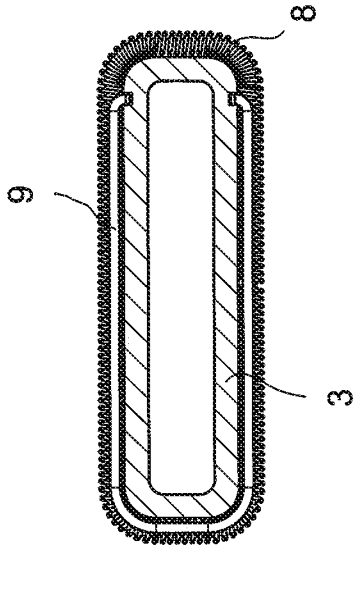
Fig. 17

Fig. 20
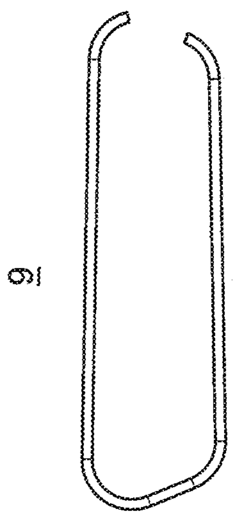
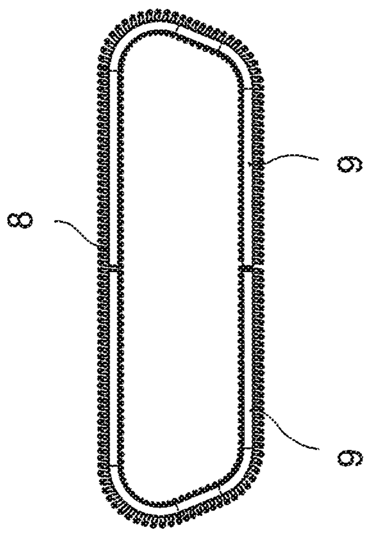
Fig. 21
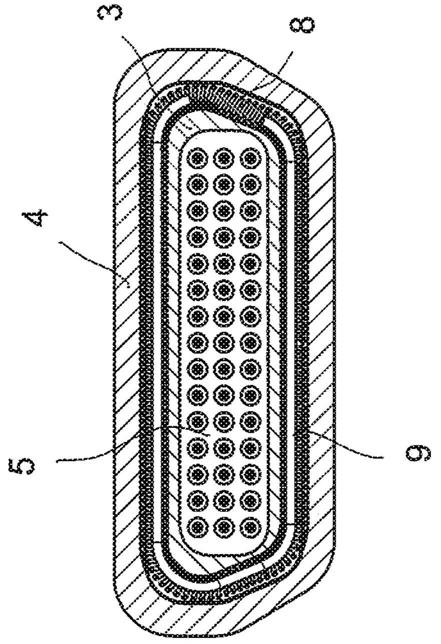
Fig. 19

COIL SPRING AND CONNECTOR WITH A COIL SPRING

CROSS-REFERENCE TO RELATED APPLICATIONS

This application claims priority to European Patent Application 21182800.9, entitled Coil Spring and Connector with a Coil Spring, filed Jun. 30, 2021, the disclosure of which is incorporated by reference herein in its entirety.

FIELD OF THE INVENTION

The invention relates to a coil spring comprising a longitudinal component located within the coil spring, wherein the longitudinal component runs generally along the direction of a longitudinal axis of the coil spring. The invention also relates to a method of shaping such a coil spring. Further, the invention relates to a connector part with such a coil spring. The invention moreover relates to a connector with a connector part that comprises the afore-mentioned coil spring.

BACKGROUND OF THE INVENTION

The European patent application EP 3575627 A1 discloses a coil spring, ia, for use in a groove of a housing, which coil spring has a longitudinal component positioned within a plurality of interconnected coils of the coil spring. The longitudinal component runs along an axis of the coil spring in order to increase rigidity of the coil spring. This serves to avoid that the coil spring comes out of the groove when subjected to vibration or impact.

From the UK patent application GB 2127626 A, a spring structure is known that includes a coil spring extending round a groove in a cylindrical housing, the coil spring (62) being biased towards the base of the groove by a spring extending round the groove and located within the turns of the coil spring. The spring structure provides a circumferential electrical contact between earthed electrical members and, thereby, ensure continuity of radio frequency shielding.

The U.S. Pat. No. 4,355,854 A discloses a coiled spring located in an annular space formed between a coupling nut and a body for locking the nut to the body when the nut is threaded in place. The coil spring has a metal core which is located within and extends through the coils of the spring to hold the spring in an annular configuration and confine coil movement to prevent crushing of the coils of the spring when the coupling nut is tightened.

OBJECT OF THE INVENTION

It is an object of the present invention to provide an improved coil spring which comprises a longitudinal component located within the coil spring, wherein the longitudinal component runs generally along the direction of the longitudinal axis of the coil spring. Another object of the invention is to provide an improved method of shaping such a coil spring. It is a further object of the invention to provide an improved connector part with such a coil spring. Moreover, the invention aims at providing an improved connector with a connector part that comprises the afore-mentioned coil spring.

Solution According to the Invention

In the following, any reference to one (including the articles “a” and “the”), two or another number of objects is, provided nothing else is expressly mentioned, meant to be understood as not excluding the presence of further such objects in the invention. The reference numerals in the patent claims are not meant to be limiting but merely serve to improve readability of the claims.

According to one aspect of the invention, the problem is solved by a coil spring with the features of claim 1. The coil spring comprises a longitudinal component located within the coil spring, which longitudinal component runs generally along the direction of a longitudinal axis of the coil spring. The longitudinal component is in contact with the coil spring and biases the coil spring into a shape different from its natural shape.

In the context of the present invention, a “coil spring” comprises a multitude of interconnected coils, such as turns, loops or windings. These coils preferably are identical.

In the context of the present invention, the “longitudinal axis” is the axis that extends into the longitudinal direction of the coil spring. The longitudinal direction is the direction in which the coils are arranged one after the other. The longitudinal axis can be straight or curved. For example, in the case of a circular annular coil spring, the axis is circular.

In the context of the present invention, the coil spring’s “natural shape” is its shape if neither an external force (such that of vibration, impact, a groove in which the coil spring is located, or the like) nor the longitudinal component act upon the coil spring. In the context of the present invention, “biasing” the coil spring in a shape different from its natural shape means that the coil spring is forced into this different shape.

According to a further aspect of the invention, the problem is solved by a connector part with the features of claim 6. The connector part is configured for being connected with a mating connector part and is comprising the coil spring of the first aspect of the invention.

According to another aspect of the invention, the problem is solved by a connector part with the features of claim 7. The connector part is configured for being connected with a mating connector part. It has a coil spring that comprises a longitudinal component located within the coil spring, which longitudinal component runs generally along the direction of a longitudinal axis of the coil spring and is in contact with the coil spring. The connector part moreover comprises a groove in which the coil spring is accommodated and the longitudinal component of the coil spring biases the coil spring into a shape different from the shape into which the coil spring is biased by the groove.

According to yet another aspect of the invention, the problem is solved by a connector with the features of claim 10. A connector comprising a connector as described above and a mating connector part.

According to a final aspect of the invention, the problem is solved by a method of shaping a coil spring, the method having the features of claim 13. The method comprises locating a longitudinal component within the coil spring, wherein the longitudinal component runs generally along the direction of a longitudinal axis of the coil spring such that the longitudinal component is in contact with an inner surface of the coil spring. The longitudinal component biases the coils spring into a shape defined by the longitudinal component or by a groove in which the coil spring is accommodated.

PREFERRED EMBODIMENTS OF THE INVENTION

Preferred features of the invention which may be applied alone or in combination are discussed in the following and in the dependent claims.

The preferred coil spring is resilient. Preferably, the longitudinal component biases the coil spring against its resilience into the shape different from its natural shape or into the shape different from the shape into which the coil spring is biased by the groove.

In a preferred embodiment of the invention, the coil spring is annular. Preferably, the annular coil spring is formed by joining, particularly preferably welding, two ends of the coil spring together. This coil spring, in turn, can consist of a row of multiple component coils joined at their ends. The term "annular" in the context of the present invention refers to any closed shape. In particular, annular does not imply circular. Yet, the natural shape of a preferred annular coil spring is essentially circular. Accordingly, in a preferred embodiment of the invention, the longitudinal component biases the annular coil spring into a shape different form a circular shape.

The coil spring can for example be a helical spring, a ribbon spring, a radial canted coil spring, or an axial canted coil spring or any similar type of spring. The preferred coil spring comprises or consists of an electrically conductive material, for example a metal wire. A preferred material of the coil spring is spring steel, copper or beryllium copper alloy. The invention encompasses both coil springs with an additional plating of the base material and coil springs that are not plated. The plating may for example be a material of particularly high electrical conductivity (if such high conductivity is desired) or hardness (if the coil spring is under heavy mechanical duty). The skilled person is aware of suitable base materials and plating materials depending on the particular application.

The preferred longitudinal component is resilient. It preferably comprises or consists of a metal wire. A suitable material which the longitudinal component comprises or consists of is spring steel. In addition or alternatively, the longitudinal component comprises a plastic material or consists of a plastic material. Preferably, the longitudinal component is located partly or entirely within the coil spring. Preferably, the longitudinal component is in contact with the interior surface of the coil spring in order to bias the coil spring into a shape different from its natural shape and/or the shape into which the coil spring is biased by the groove.

In a preferred embodiment of the invention, the longitudinal component extends almost the entire length of the coil spring or only along part of the length of the coil spring, preferably, less than 99%, more preferably less than 95%, more preferably less than 90%, more preferably less than 80%, more preferably less 70%. In some embodiments, the longitudinal component extends along less than 50% of the length of the coil spring, preferably, less than 40%. In a preferred embodiment of the invention, the longitudinal component extends along more than 10% of the length of the coil spring, more preferably more than 20%, more preferably more than 30%. The preferred longitudinal component has two ends.

Preferably, the longitudinal component increases or decreases the curvature of at least a section along the length of the coil spring as compared to the curvature this section has when the coil spring is in its natural shape and/or in the shape into which the coil spring is biased by the groove.

A preferred longitudinal component or at least a section of the preferred longitudinal component has the shape of a straight line, a segment of a circle, or a segment of an ellipse or another oval. Preferably, the longitudinal component comprises a combination of two, three or more of such segments. In particular, the shape of the preferred longitudinal component is different from a single segment of a circle.

In a preferred embodiment of the invention, the longitudinal component has at least one, preferably at least two, more preferably at least three straight sections. A preferred longitudinal component is C-shaped, preferably with two parallel straight sections forming the two arms of the C-shape.

The invention also encompasses embodiments in which in addition to a first longitudinal component of the kind discussed above there are one or more further longitudinal components. Each of the further longitudinal components can have any combination of the properties of the longitudinal components discussed above. Preferably, the multiple longitudinal components do not overlap along the longitudinal axis of the coil spring. In a preferred embodiment of the invention, the longitudinal components in combination extend along almost the entire length of the coil spring or only along part of the length of the coil spring, preferably, less than 99%), more preferably less than 95%, more preferably less than 90%, more preferably less than 80%), more preferably less 70%. In some embodiments, the longitudinal component extends along less than 50%) of the length of the coil spring, preferably, less than 40%. In a preferred embodiment of the invention, the longitudinal component extends along more than 10% of the length of the coil spring, more preferably more than 20%, more preferably more than 30%. Each longitudinal component preferably has two ends.

The preferred connector part has a groove in which the coil spring is accommodated. The preferred groove is on a sleeve of the connector, which sleeve, preferably, forms the housing or part of the housing of the connector part, or is attached to the housing of the connector part. The groove may be placed on the inner or the outer surface of the sleeve.

The shape of a preferred groove comprises a combination of one or more of segments in the shape selected from the group consisting of a straight line, a segment of a circle, or a segment of an ellipse or another oval. In a preferred embodiment of the invention, the groove has at least one, preferably at least two, more preferably at least three straight sections.

A preferred groove is annular. Preferably, the annular groove is non-circular. Rather, a preferred annular groove has the general shape of a trapezium, a parallelogram or a rectangle, preferably with rounded corners.

In a preferred embodiment of the invention, the longitudinal component biases at least a segment of the coil spring towards the groove. In the context of the present invention, "towards the groove" means that due to the longitudinal component, the distance between the segment of the coil spring and the bottom of the groove is reduced. Preferably, more than one segment of the coil spring, for example two segments of the coil spring, are biased towards the groove. Two such segments may for example be arranged on opposite sides of the connector part.

In a preferred connector, when connector part comprise the coil spring with the longitudinal element is mounted into the connector part's groove, the longitudinal component urges at least part(s) of the coil spring, against at least part(s) of the groove, in which the coil spring is accommodates. Preferably, the longitudinal component urges this/these at least part(s) of the coil spring against more specifically the bottom(s) of this/these at least part(s) of the connector part's groove. In other words, the longitudinal element's shape and resilience is such that it biases the at least part(s) of the coil spring into and against the groove. It is an achievable advantage of this embodiment of the invention that due to the longitudinal element's bias, at least part(s) of the coil spring is/are clamped into the groove. Thereby, in particular, the at least part(s) of the coil spring can be held firmly in the groove.

Preferably, in a connector part with a longitudinal component that has two ends, at least one of the ends, particularly preferably both ends, is/are fixed to another component of the connector part. This other component preferably is the component on which the groove is placed, for example the sleeve. More preferably, the end(s) is/are fixed to the other component inside the groove.

The preferred connector part is a plug or a receptacle. Accordingly, the preferred connector is a plug-in connector wherein for mating the connector part is inserted into the mating connector part or vice versa.

Preferably, the coil spring provides an electrical contact between the connector part and the counter connector part when the two are mated. It is preferred that when the connector part is mated with the mating connector part, at least part of the coil spring is loaded between the connector part and the mating connector part. Thereby, advantageously, a well-defined electrical contact between the connector part and the coil spring on one hand and the coil spring and the mating connector part on the other hand, and thus from the connector part to the mating connector part (namely, via the coil spring) can be provided. Yet, the invention also encompasses embodiments in which the coil spring is placed between the connector part and the mating connector part when the connector part is mated with the mating connector part, without being loaded.

The electrical contact preferably is between a shielding member of the connector part and a shielding member of the mating connector part. It is an achievable advantage of this embodiment of the invention that a continuity of radio frequency shielding from the connector part to the mating connector part can be obtained.

Preferably, the coil spring serves to mechanically attach the connector part to the mating connector part, more preferably it serves to removably attach the connector part to the mating connector part. A preferred mating connector comprises a groove for at least part of the coil spring to latch into. Thereby, it can advantageously be achieved that the connector part can be latchingly attached to the mating connector part of the connector. Preferably, the groove of the mating connector part is shallower than the groove of the connector part. Thereby it is achievable that upon separation of the connector part from the mating connector part, the coil spring remains on the connector part. A mechanical attachment of the connector part to the mating connector part does not necessarily require that the coil spring is loaded between the connector part and the mating connector part when the two are mated. Accordingly, in one embodiment of the invention where the coil spring serves to mechanically attach the connector to the mating connector, the coil spring is not loaded between the connector part and the mating connector part when the connector part and the mating connector part are mated. Rather particularly preferably, it is placed to fit without compression into the space provided between the connector part and the counter connector part at the location of the coil spring.

While in some embodiments the groove has a uniform depth, in other embodiments the groove's depth is non-uniform. As a result of such non-uniform depth, if the groove is applied to the housing or a part of the housing of the connector part, the grove will not follow the general shape of the housing or the part of the housing. Advantageously, with the non-uniform depth of the groove it is achievable that the coils spring, when accommodated inside the groove, the distance between the top of the grove and the top of the coil spring (ie, the groove's outer edge), both measured from the bottom of the groove differ. For example, at some locations along the groove, the coil spring extends beyond the outer edge of the groove, and in other locations it does not or it extends beyond the outer edge by a different amount.

In a preferred embodiment of the connector part, the coil spring only at some parts of the groove of the connector part extends beyond an outer edge of the groove, while at the remaining parts of the groove, the coil spring is fully insider the groove. Accordingly, in a preferred mating connector part, rather than one annular groove there are one or more separate grooves with two ends to accommodate the coil spring where it extends beyond the groove of the connector part. For example, if the groove of the connector part is an annular groove and the coil spring extends beyond this annular groove only in two, preferably straight, parts on opposite sides of the groove, then the mating connector preferably comprises two, preferably straight grooves on opposite sides of the mating connector to accommodate the two parts of the coil spring.

BRIEF DESCRIPTION OF THE DRAWINGS

In the following, further preferred embodiments of invention are illustrated by means of examples. The invention is not limited to these examples, however.

The drawings schematically show:

FIGS. 13 to 16 Four exemplary coil springs with longitudinal components of different shape;

FIG. 17A longitudinal component inside the coil spring wherein the ends of the longitudinal component are attached to the sleeve of the connector part inside the groove;

FIG. 18 Two longitudinal components inside the coil spring wherein the ends of the longitudinal components are attached to the sleeve of the connector part inside the groove.

FIG. 19A coil spring with a longitudinal component that urges the coil spring into the long parallel sides of the groove;

FIG. 20 The longitudinal component of the coil spring of FIG. 19 before it is applied to the coil spring and the groove; and FIG. 21 Two longitudinal components inside the coil spring which, together, extend almost along the entire length of the coil spring.

DETAILED DESCRIPTION OF AN EMBODIMENT OF THE INVENTION

Figure 1:
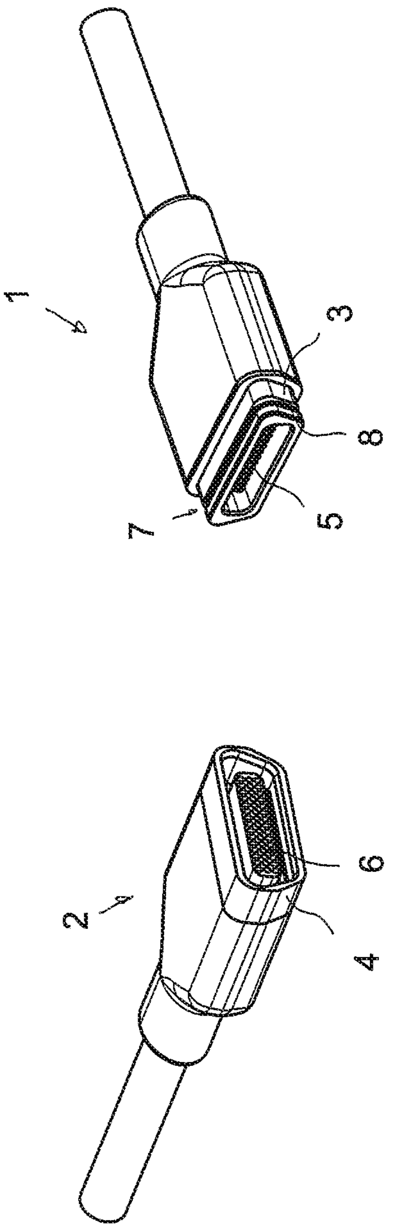
FIG. 1A perspective view of a connector comprising of a connector part (right) and a mating connector part (left)

In the following description of preferred embodiments of the invention, identical reference numerals refer to identical or similar components.

A plug-in connector shown in FIG. 1 comprises a connector part 1 in the form of a plug shown, on the right, and a mating connector part 2 in the form of a receptacle, shown on the left. The connector part 1 has a sleeve 3 that can be inserted into a matching sleeve 4 of the mating connector part 2 to mate it with the latter. Both sleeves 3, 4 have a cross section that resembles an isosceles trapezium with two long parallel sides and rounded edges. The sleeves each surround a connector face 5, 6 comprising multiple pins (in the case of the connector part) and sockets (in the case of the mating connector part) and act as shielding members of the connector part 2 and the mating connector part 3 to shield the pins and the sockets from electromagnetic interference.

Figure 4:
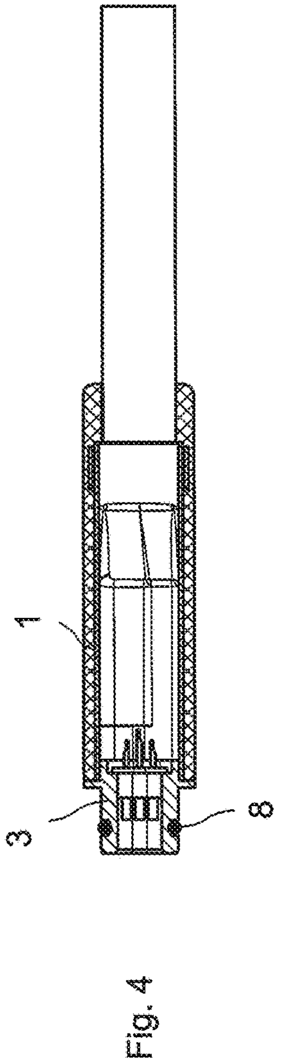
FIG. 4A cross-sectional view of the connector part of FIG. 3.
Figure 5:
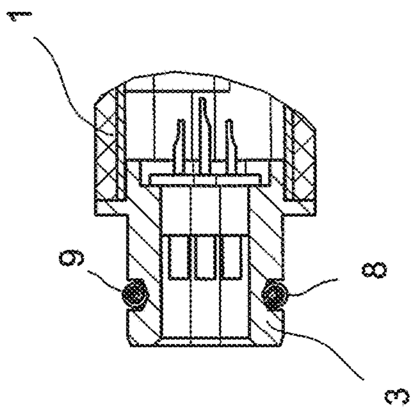
FIG. 5A detail of FIG. 4.

The sleeve 3 of the connector part 1 on its outer side comprises an annular groove 7, which, likewise, has the general shape of an isosceles trapezium with two long parallel sides and rounded edges. An annular helical coil spring 8 is accommodated in the groove 7, as can be best seen in FIGS. 4 and 5. The coil spring 8 comprises multiple windings of a wire of metal, for example spring steel, and it has been formed by welding two ends of the coil spring together.

Figure 2:
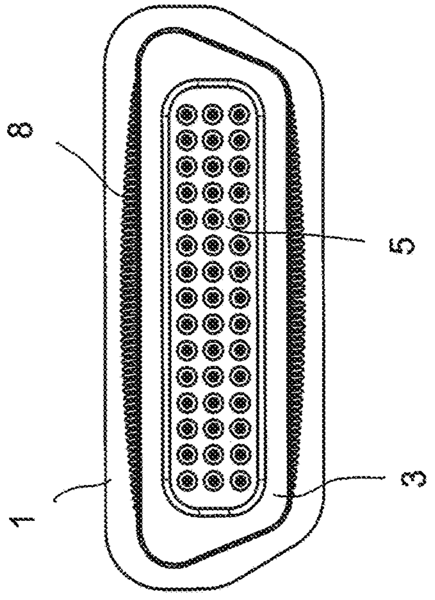
FIG. 2A view onto the connector face of the connector part with a coil spring accommodated in a groove of the connector part, the coil spring lacking a longitudinal component.
Figure 7:
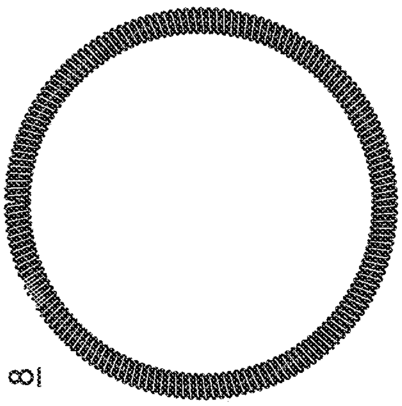
FIG. 7 The coil spring in its natural shape.

The natural shape of the coil spring 8 is circular as shown in FIG. 7. As shown in FIG. 2, if this coil spring 8 is accommodated in the annular groove 7, its intrinsic resilience urges it into a shape in which it overly protrudes from the two long parallel sides. This can hamper insertion of the connector part 1 with the mating connector part 2, or it can damage the coil spring 8.

Figure 9:
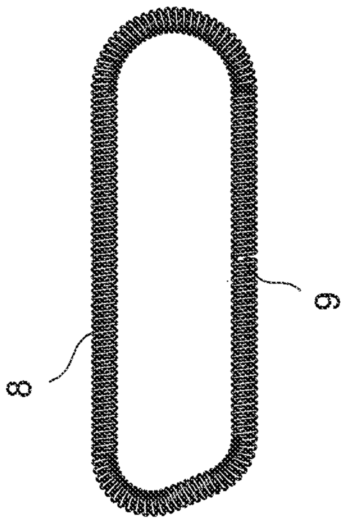
FIG. 9 The coil spring with the longitudinal component inside.
Figure 8:
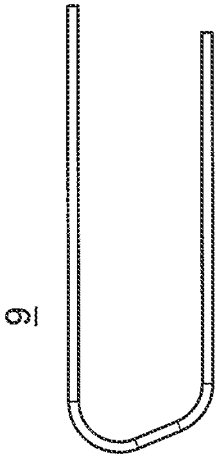
FIG. 8 The longitudinal component.

In order to overcome this problem, a longitudinal component 9 as shown in FIG. 8 is provided inside the annular coil spring 8, which runs generally along the direction of a longitudinal axis of the coil spring 8, is in contact with the inside of the annular coil spring 8 and biases the coil spring into a shape different from its natural shape. The longitudinal component 9 extends along about 80% of the length of the coil spring 8. More specifically, the longitudinal component 9 is C-shaped with two parallel long straight sections forming the two arms of the C-shape. A third, short diagonal straight section is connected to the two parallel long straight sections by sectors of a circle. In combination, the sections of the longitudinal component 9 resemble the course of part of the groove 7, namely the two long parallel sides and one of the diagonal sides. Accordingly, when inside the coil spring 8, the longitudinal component 9 biases the coil spring 8 into a shape that is more similar to that of the groove 7 and in particular has two essentially parallel long sides, as shown in FIG. 9.

Figure 3:
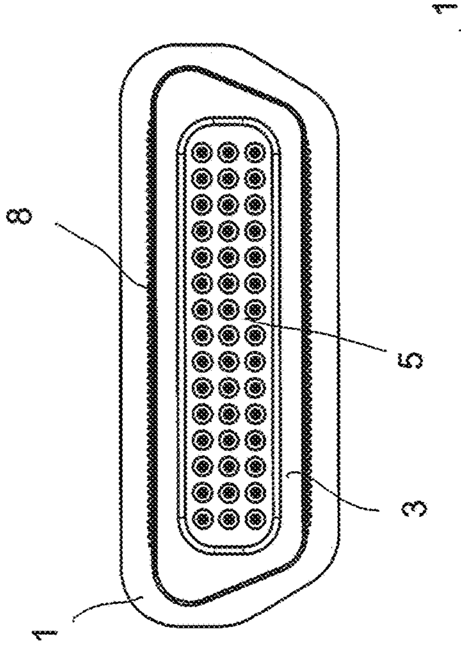
FIG. 3A view onto the connector face of the connector part with a coil spring accommodated into a groove of the connector part, the coil spring being provided with a longitudinal component.

As a result, if the coil spring 8 comprising this longitudinal component 9 is accommodated in the groove 7, an excessive protrusion of the coil spring 8 from the two long parallel sides of the groove 7 is prevented. This is shown in FIG. 3. Insertion of the connector part 1 with the mating connector part 3 is facilitated and damage to the coil spring 8 is avoided. This is, because the arms of the C-shaped longitudinal component 9 bias the corresponding segments of the coil spring 8 towards the groove. The elevation view of FIG. 6 shows how, for this purpose, the arms of longitudinal component 9 are in contact with the inner surface of the coil spring 8 to bias the coil spring 8 against the bottom of the long parallel sides of the groove 7.

Figure 6:
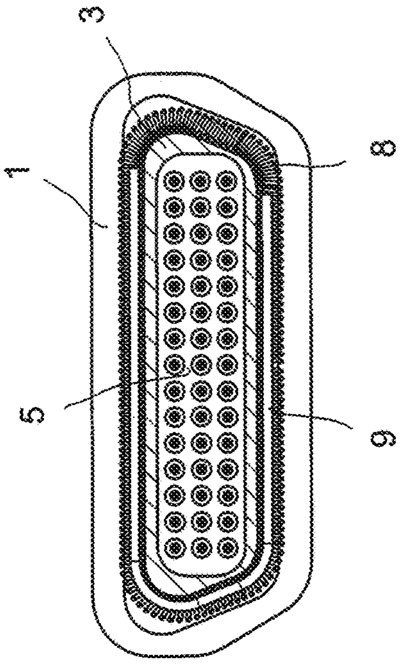
FIG. 6A cross-sectional view of the connector part of FIGS. 3 to 5 in the plane of the coil spring exposing the coil spring and the longitudinal component inside the coil spring.
Figure 10:
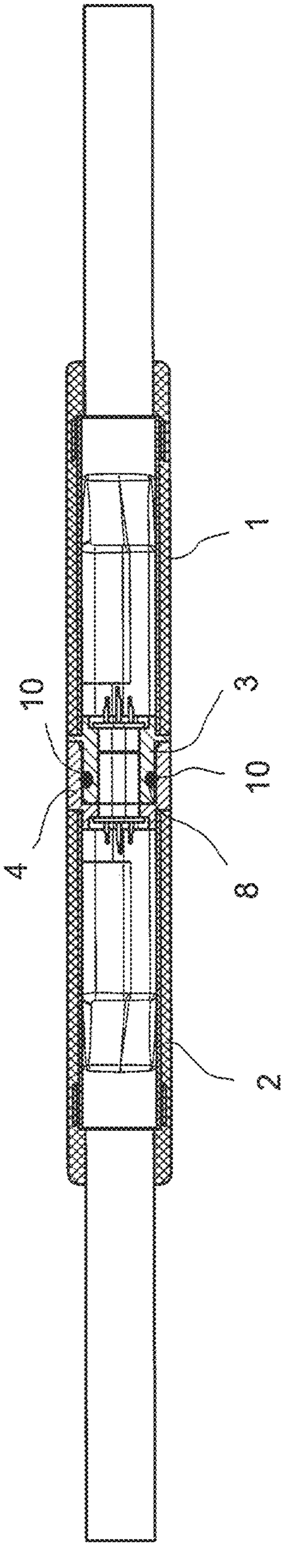
FIG. 10A cross sectional view of the connector with the connector part mated with the mating connector part.
Figure 12:
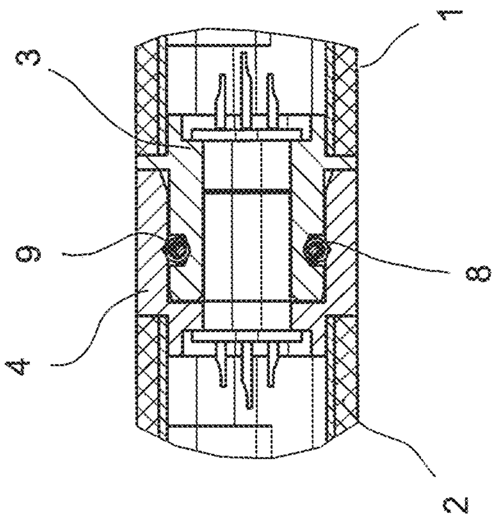
FIG. 12A detail of FIG. 10.
Figure 11:
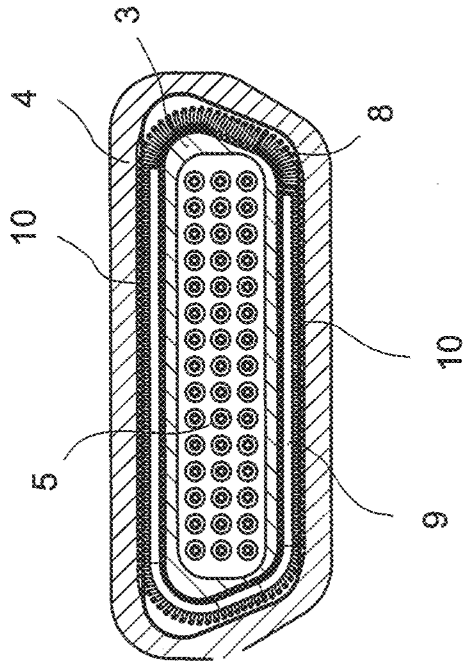
FIG. 11A cross-sectional view of the connector part patent to the mating connector part in the plane of the coil spring exposing the coil spring and the longitudinal component inside the coil spring.

FIGS. 3 and 6 also show that the coil spring 8 is entirely contained within the groove 7, with the exception of the long parallel sides of the groove 7, from which the coil spring 8 somewhat protrudes. This is, because, as can be best seen in FIG. 6, the groove 7 is of non-uniform depth; at the diagonal side portions (right and left in FIG. 6), the grove 7 is deep enough to fully accommodate the coil spring 8, while along the long parallel sides, the groove 7 is shallower in order to make the coil spring 8 protrudes somewhat beyond the groove's 7 outer edge. When the connector part 1 is mated with the mating connector part 2, these protruding parts of the coil spring 8, due to the coil spring's 8 resilience, are loaded between the connector part 1 and the counter connector part 2, more precisely between the sleeve 3 of the connector part 1 and the sleeve 4 of the mating connector part 2 as is shown in FIGS. 10 to 12. The coil spring 8 thereby provides an well-defined electrical contact between the connector part 1 and the mating connector part 2. Thereby, a continuity of radio frequency shielding from the connector part 1 to the mating connector part 2 is achieved.

As can also be seen in FIGS. 10 to 12, the sleeve 4 of the mating connector part 2 comprises two parallel straight grooves 10 on its inside for the parts of the coil spring 8 that protrude from the groove 7 of the sleeve 3 of the connector part 1 to latch into. As a result, the connector part 1 can latchingly be attached to the mating connector part 2 of the connector. The grooves 10 are considerably shallower than the groove 7 of the connector part 1 so that upon separation of the connector part 1 from the mating connector part 2, the coil spring 8 remains on the connector part 1.

In FIGS. 13 to 16, several exemplary shapes of the longitudinal component 9 are provided, and it is shown in which shape they can bias the coil spring 8 when the coil spring 8 with the longitudinal component 9 is accommodated in a corresponding groove 7 of the connector part 7. Typically, these shapes will resemble the shape of the groove 7 in which the coil spring 8 is accommodated. Generally, the longitudinal component 9 increases or decreases the curvature of at least a section along the length of the coil spring 8 as compared to the curvature this section has when the coil spring 8 is in its natural shape and/or in the shape into which the coil spring 8 is biased by the groove 7 alone. The longitudinal component 9 of FIG. 13 is similar to that discussed above but in addition has circular sectors attached to the end of its arms in order to even better bias the coil spring 8 into the trapezium shape of the groove 7 of the above-described connector part's 1 sleeve 3. The longitudinal component 9 of FIG. 14 differs from that originally discussed in that the parallel straight arms of the C-shape are slightly curved outwardly. The C-shaped longitudinal component 9 of FIG. 15 is suitable for biasing the coil spring 8 into a shape that better suits a rectangular rather than a trapezium groove 7. Finally, the longitudinal component 9 of FIG. 16 has the shape of the sector of an ellipse suitable for accommodation the coil spring 8 in an elliptical groove 7.

The longitudinal component 9 shown in FIG. 17 has its two ends fixed to the sleeve 3 of the connector part 1 inside the groove 7. FIG. 18 shows a similar arrangement but with two longitudinal components 9, each at its two ends fixed to the sleeve 3 of the connector part 1 inside the groove 7. Another embodiment with two longitudinal components 9 is shown in FIG. 21. Here, the two longitudinal components 9 are not fixed to the connector part 1. Rather, they extend almost along the entire length of the coil spring 8 so that their ends can touch or can almost touch, depending on the exact shape of the groove 7.

The longitudinal element 9 of FIG. 20 is similar to that of FIG. 13 with the difference that the two arms run slightly towards each other. As a result, when it is inside the coil spring 8 and the coil spring 8 is insider the connector part's 1 groove 7, the longitudinal component 9 urges the coil spring 8 with increased force against the bottom of the parallel long sides of the groove 7. Due to the longitudinal element's 9 bias, the coil spring 8 is clamped into the groove 7 and held firmly therein.

The features as described in the above description, claims and figures can be relevant individually or in any combination to realise the various embodiments of the invention.

The invention claimed is:

1. An annular coil spring accommodated in a groove of a connector part, wherein the groove is annular and non-circular in a circumferential direction, the coil spring comprising a longitudinal component located within the coil spring, wherein the longitudinal component runs generally along the direction of a longitudinal axis of the coil spring and wherein the longitudinal component is in contact with the coil spring, and wherein the longitudinal component biases the coil spring into a shape different from the coil spring's natural shape and that is different from a circular shape, and wherein the groove has two long parallel sides in the circumferential direction and the depth on the two long sides is shallower than the depth on other than the two long sides, and wherein the shape of the longitudinal component is determined so that, with the coil spring accommodated in the groove biased, the coil spring slightly protrudes from the groove on the two long sides, while preventing the coil spring from protruding from the groove other than on the two long sides.

2. The coil spring according to claim 1, wherein the coil spring is a helical spring, a ribbon spring, a radial canted coil spring, or an axial canted coil spring.

3. The coil spring according to claim 1, wherein the longitudinal component is a metal wire.

4. The coil spring according to claim 1, wherein the longitudinal component extends only along part of the length of the coil spring.

5. The coil spring according to claim 1, wherein the longitudinal component has at least one straight sections.

6. A connector part configured for being connected with a mating connector part, wherein the connector part comprises a coil spring according to claim 1.

7. A connector part configured for being connected with a mating connector part, wherein the connector part has a coil spring, the coil spring comprising a longitudinal component located within the coil spring, wherein the longitudinal component runs generally along the direction of a longitudinal axis of the coil spring and wherein the longitudinal component is in contact with the coil spring, and wherein the connector part comprises a groove, which is annular and non-circular in a circumferential direction, in which the coil spring is accommodated and the longitudinal component of the coil spring biases the coils spring into a shape different from the shape into which the coil spring is biased by the groove and that is different from a circular shape, wherein the groove has two long parallel sides in the circumferential direction, and the depth on the two long sides is shallower than the depth on other than the two long sides, and wherein the shape of the longitudinal component is determined so that, with the coil spring accommodated in the groove biased, the coil spring slightly protrudes from the groove on the two long sides, while preventing the coil spring from protruding from the groove other than on the two long sides.

8. The connector part according to claim 7, wherein the longitudinal component biases at least a segment of the coil spring towards the groove.

9. The connector part according to claim 7, wherein at least one end of the longitudinal component is fixed to a housing of the connector part.

10. A connector comprising a connector part according to claim 7 and a mating connector part.

11. The connector of claim 10, wherein the coil spring provides an electrical contact between the connector part and the mating connector part.

12. The connector of claim 10, wherein the mating connector comprises a groove at least part of the coil spring can latch into.

13. A method of shaping a coil spring that is accommodated in a groove of a connector part, wherein the groove is annular and non-circular in a circumferential direction, the method comprising locating a longitudinal component within the coil spring, wherein the longitudinal component runs generally along the direction of a longitudinal axis of the coil spring such that the longitudinal component is in contact with an inner surface of the coil spring, and wherein the longitudinal component biases the coils spring into a shape different from the coil spring's natural shape and/or from the shape into which the coil spring is biased by the groove in which the coil spring is accommodated, and that is different from a circular shape, wherein the groove has two long parallel sides in the circumferential direction, and the depth on the two long sides is shallower than the depth on other than the two long sides, and wherein the shape of the longitudinal component is determined so that, with the coil spring accommodated in the groove biased, the coil spring slightly protrudes from the groove on the two long sides, while preventing the coil spring from protruding from the groove other than on the two long sides.

* * * * *